(12) United States Patent
Berke

(10) Patent No.: US 7,984,988 B2
(45) Date of Patent: *Jul. 26, 2011

(54) ORTHOKERATOLOGICAL CONTACT LENSES AND DESIGN METHODS THEREFOR

(75) Inventor: William M. Berke, Cowan Heights, CA (US)

(73) Assignee: Natural Focus, LLC, Los Angeles, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/714,158

(22) Filed: Feb. 26, 2010

(65) Prior Publication Data
US 2010/0157250 A1 Jun. 24, 2010

Related U.S. Application Data

(63) Continuation of application No. 12/029,426, filed on Feb. 11, 2008, now Pat. No. 7,682,020, which is a continuation-in-part of application No. 11/282,294, filed on Nov. 17, 2005, now Pat. No. 7,530,689.

(60) Provisional application No. 60/629,221, filed on Nov. 17, 2004.

(51) Int. Cl.
G02C 7/04 (2006.01)
(52) U.S. Cl. ............... 351/160 R; 351/161; 351/247
(58) Field of Classification Search ............ 351/160 R, 351/161, 162, 160 H, 212, 247
See application file for complete search history.

(56) References Cited

U.S. PATENT DOCUMENTS

| 5,050,981 | A  | * | 9/1991 | Roffman | 351/177 |
| 7,530,689 | B2 | * | 5/2009 | Berke   | 351/160 R |
| 7,682,020 | B2 | * | 3/2010 | Berke   | 351/160 R |

* cited by examiner

Primary Examiner — Huy K Mai
(74) Attorney, Agent, or Firm — Sheppard Mullin Richter & Hampton LLP; David E. Heisey

(57) ABSTRACT

The present invention provides an orthokeratological contact lens to be worn on a patient's cornea and methods for prescribing the same. The contact lens comprises a parabolic lens having an inner surface configured to face an epithelium of the patient's cornea, wherein the parabolic lens is adapted to reshape the cornea by way of epithelium tissue growth. In a pre-treatment configuration, an outer surface of the epithelium does not conform to the contours of the inner surface of the parabolic lens such that there exits a gap comprising a hypertrophy volume that is disposed between the epithelium and the parabolic lens.

15 Claims, 3 Drawing Sheets

ORTHOKERATOLOGICAL CONTACT LENSES AND DESIGN METHODS THEREFOR

REFERENCE TO RELATED APPLICATIONS

This application is a continuation of U.S. patent application Ser. No. 12/029,426, entitled "Orthokeratological Contact Lenses and Design Methods Therefor," filed on Feb. 11, 2008, now U.S. Pat. No. 7,682,020 which is a continuation-in-part of U.S. patent application Ser. No. 11/282,294, entitled "Orthokeratological Contact Lenses and Design Methods Therefor," filed on Nov. 17, 2005, now U.S. Pat. No. 7,530,689 which claims priority from U.S. Provisional Patent Application No. 60/629,221, filed on Nov. 17, 2004, the contents of which are incorporated herein by reference.

FIELD OF THE INVENTION

The present invention is directed generally to contact lenses and more particularly to rigid orthokeratological contact lenses and methods for prescribing the same.

BACKGROUND OF THE INVENTION

Millions of people experience difficulties with their vision due to a number of common refractive conditions such as myopia (nearsightedness) and hyperopia, (farsightedness). Myopia is a visual abnormality where an eye cannot focus on far-away objects because the cornea is curved too steeply and/or the eye is elongated axially front to back, such that it fails to provide a sharp focus of light at the retinal plane of the eye. On the other hand a hyperopic eye cannot focus on either far or near objects because the curvature of the cornea of the eye is too flat and/or too short axially front to back to provide adequate focusing at the retinal plane of the eye.

Another common refractive vision problem is astigmatism, which may exist alone or in combination with either myopia or hyperopia. With astigmatism, unequal curvatures of one or more refractive surfaces of the eye prevent light rays from focusing sharply at the plane on the retina, thereby resulting in blurred vision. Yet another common vision problem is presbyopia, which may occur with other refractive problems such as hyperopia, myopia, and/or astigmatism. Presbyopia is the most common vision problem in adults 40 years of age and older. At this age, many people begin to experience difficulty focusing on close objects, most commonly due to the loss of flexibility of the eye's focusing apparatus.

There exist numerous known methods for treating myopia. One conventional method of correcting the visual blur caused by myopia involves wearing a pair of concave (minus powered) spectacle lenses. In some cases, the visual blur caused by myopia may be corrected with concave (minus powered) contact lenses. In the 1970's and 1980's attempts were made to permanently correct myopia through surgical procedures such as radial keratometry (RK). More recently, approaches to correcting myopia through laser surgical reshaping of the cornea (e.g., PRK, LASIK, LASEK) have become popular.

Orthokeratology is a further approach for treating myopia, wherein the corneal shape is altered by wearing rigid contact lenses designed to continually exert pressure on selected locations of the cornea to gradually mold the cornea into the desired corneal curvature. Referring to FIG. 1 (prior art), a cornea 250 is depicted in a manner showing each of the five layers of tissue: epithelium 200, Bowman's layer 210, stroma 220, Descemet's membrane 230 and endothelium 240. With reference now to FIG. 2 (prior art), a cornea 2 is depicted including an epithelium 3 comprising a thin layer of cells that cover the surface of the cornea. Epithelium includes an outer surface 4 and an inner surface 8. In FIG. 2 (prior art), the cornea 2 is shown in juxtaposition with a known contact lens 6, wherein a centerline 9 of the cornea 2 is indicated for purposes of orientation. During conventional orthokeratology treatment, the outer surface 4 of epithelium 3 is compressed against the inner surface of a relatively flat contact lens 6 such that it is thinned, thus creating a refractive adjustment or correction in the cornea.

After the refractive adjustment, a retainer lens is worn on a part-time basis to prevent the cornea from returning to its previous shape. This "maintenance period" lasts for a predetermined amount of time after removal of the corrective rigid contact lens. The successfulness of orthokeratology treatment depends on various factors including the shape and structure of the contact lens. For example, a conventional contact having a central radius of curvature that is larger than the central radius of the cornea (i.e., a "flat" contact lens) is widely believed to change the shape of the cornea by compressing the corneal surface at its apex. The reshaped cornea has a lengthened radius of curvature in its central zone, thereby reducing or eliminating the myopia.

Orthokeratology has been performed with varying degrees of success since the early 1970's. Three factors that impact the effectiveness and desirability of orthokeratology procedures and lenses include: (1) the time needed to achieve the desired visual correction; (2) the amount of myopia that can be corrected using orthokeratology; and (3) the maintenance period before the correction degrades. Regarding the time needed to achieve the desired visual correction, conventional orthokeratology techniques typically require as long as several months to accomplish a relatively small amount of myopia reduction. In addition, conventional orthokeratology techniques and lenses provide an inadequate maintenance period duration. In particular, a patient must frequently wear a retainer lens in order to increase the time between corrective sessions with the orthokeratology lens.

SUMMARY OF THE INVENTION

Some embodiments of the present invention are directed to a precisely designed contact lens, based on sound physiological and anatomical considerations, that can be used for effective and highly predictable orthokeratology of myopia. In other embodiments, the present invention includes contact lenses that can be used for effective and highly predictable orthokeratology of myopia over a shorter treatment period. In further embodiments, the present invention includes a contact lens that can be used for effective and highly predictable orthokeratology of myopia with substantial holding power such that the correction lasts for several days before a retainer lens is required.

In some embodiments, the present invention includes an orthokeratological contact lens to be worn on a patient's cornea, comprising a parabolic lens having an inner surface configured to face an epithelium of the patient's cornea, wherein the parabolic lens is adapted to reshape the cornea by way of epithelium tissue growth. In such embodiments, the epithelium has a pre-treatment configuration, wherein an outer surface of the epithelium does not conform to the contours of the inner surface of the parabolic lens such that there exits a gap comprising a hypertrophy volume that is disposed between the epithelium and the parabolic lens. In such embodiments, after the patient has worn the lens for a sufficient amount of time, the hypertrophy volume is filled as the stroma expands, thereby pushing the epithelium outward toward the lens, thereby achieving the desired refractive adjustment of the cornea. In some embodiments, the contact lens includes a plurality of zones including a treatment zone, an inverse zone, an alignment zone and a peripheral zone, wherein each zone includes a predetermined width and curvature. In various embodiments, the contact lens is configured to rest on the cornea rather than putting significant pressure on the eye tissue such that there is no significant compression of the epithelium or migration of cells.

In some embodiments, the present invention is an orthokeratological contact lens to be worn on a patient's cornea, including a parabolic lens having an inner surface configured to face an epithelium of the patient's cornea; wherein the parabolic lens is adapted to reshape the cornea by way of epithelium and stromal tissue growth. In some such embodiments, in a pre-treatment configuration, an outer surface of the epithelium does not conform to the contours of the inner surface of the parabolic lens such that there exits a gap between the epithelium and the parabolic lens. In other embodiments, the gap comprises a hypertrophy volume. In further embodiments after the patient has worn the parabolic lens for a sufficient amount of time, the hypertrophy volume is filled by stroma and epithelium tissue, thereby achieving the desired refractive adjustment of the cornea. In other embodiments the parabolic lens helps reshape the cornea when worn by the patient because the epithelium conforms to the contours of the inner surface of the parabolic lens over time. In some embodiments, the parabolic lens includes a plurality of zones. In some of these embodiments, the plurality of zones comprises 4 separate zones. In some such embodiments, the plurality of zones comprises a treatment zone, an inverse zone, an alignment zone and a peripheral zone. In some such embodiments, each zone includes a predetermined width and curvature. In yet other embodiments the parabolic lens is configured to rest on the cornea with an optimum pressure on the eye tissue so as to impart desired change without significant compression of the epithelium or migration of cells. In further embodiments, the parabolic lens is adapted to promote epithelial and stromal cell hypertrophy into the hypertrophy volume, thereby creating a new lens shape forms that corrects a myopic condition.

In yet other embodiments, the present invention is a contact lens to be worn on an epithelium of a patient's cornea, including a parabolic lens having a treatment zone, an inverse zone, an alignment zone and a peripheral zone; wherein the parabolic lens is adapted to reshape the cornea by way of outward movement of epithelium tissue. In certain embodiments, the outward movement of epithelium tissue is due to stromal tissue growth. In other embodiments, the outward movement of the epithelium tissue is due to stromal and epithelial tissue growth. In further embodiments, the treatment zone comprises the centermost zone of the lens and includes a substantially parabolic shape, which is flatter by a predetermined amount than a flattest meridian of the cornea. In other embodiments, the inverse zone comprises a parabolic curve that is steeper than the adjacent treatment zone. In some embodiments, the alignment zone comprises a parabolic curve matches a parabolic curvature of the cornea, thereby providing a substantially closed cavity and creating pressure forces that initiate epithelial and stromal hypertrophy. In other embodiments, the peripheral zone comprises a parabolic curve that is slightly flatter than the underlying cornea to provide for peripheral tear exchange.

In further embodiments, the present invention is an orthokeratological contact lens to be worn on a patient's cornea, including a parabolic lens having an inner surface configured to face an epithelium of the patient's cornea; wherein the parabolic lens is adapted to reshape the cornea by way of epithelium and stromal tissue growth; and wherein the parabolic lens comprises 4 separate zones. In some such embodiments the 4 separate zones include a treatment zone, an inverse zone, an alignment zone and a peripheral zone.

In other embodiments, the present invention includes methods of prescribing contact lenses, based on sound physiological and anatomical considerations, that can be used for effective and highly predictable orthokeratology of myopia. In some embodiments, the present invention includes methods of prescribing contact lenses that can be used for effective and highly predictable orthokeratology of myopia over a shorter treatment period. In further embodiments the invention provides methods of prescribing contact lenses that can be used for effective and highly predictable orthokeratology of myopia with substantial holding power such that the correction lasts for several days before a retainer lens is required.

In yet other embodiments, the present invention includes a method of determining a prescription for a contact lens. In some such embodiments, the method is for determining a prescription for an orthokeratological contact lens for reshaping a patient's cornea by outward movement of the epithelium caused by growth of the stroma, comprising the steps of determining the refractive error prescription of the cornea using traditional eye examination and refraction techniques, determining the overall corneal diameter, determining the topography of the cornea, calculating the epithelium and stroma volume of the cornea and making an appropriate volume adjustment based upon the epithelium and stroma volume of the cornea. The method may further comprise the steps of determining the curvature and width of the inverse zone, alignment zone and peripheral zone, and determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

In other embodiments, the present invention is a method of determining a prescription for an orthokeratological contact lens for reshaping a patient's cornea by outward movement of epithelium tissue, including the steps of: determining the refractive error prescription of the cornea using traditional eye examination and refraction techniques; determining the overall corneal diameter; determining the topography of the cornea; calculating the epithelium and stromal volume of the cornea; and making an appropriate volume adjustment based upon the epithelium and stromal volume of the cornea. In some embodiments, the contact lens comprises a parabolic lens having a plurality of zones including a treatment zone, an inverse zone, an alignment zone and a peripheral zone. In other embodiments, the method also includes the step of determining the curvature and width of the inverse zone, alignment zone and peripheral zone. In further embodiments, the method also includes the step of determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

In yet further embodiments, the present invention is a method of determining a prescription for a parabolic orthokeratological contact lens having a plurality of zones including a treatment zone, an inverse zone, an alignment zone and a peripheral zone, and for reshaping a patient's cornea by epithelium and stromal tissue growth, including the steps of: determining the refractive error prescription of the cornea using traditional eye examination and refraction techniques;

determining the overall corneal diameter; determining the topography of the cornea; calculating the epithelium and stromal volume of the cornea; and making an appropriate volume adjustment based upon the epithelium and stromal volume of the cornea. In some embodiments, the method also includes the step of determining the curvature and width of the inverse zone, alignment zone and peripheral zone. In other embodiments, the method also includes the step of determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to contact lenses, methods of producing the contact lenses, methods of prescribing the contact lenses and methods of treatment of myopia using the contact lenses. Particularly, each contact lens preferably is designed based on physiological and anatomical considerations of a patient's eye to obtain a rapid and predictable orthokeratological change in the refractive power of the eye for the purpose of correcting myopia.

Figure 3:
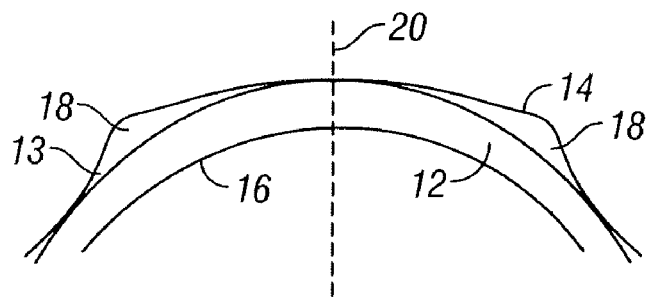
FIG. 3 illustrates a cross sectional view of an embodiment of an orthokeratological contact lens for reshaping a patient's cornea by epithelium tissue movement, in accordance with the principles of the present invention.

Referring to FIG. 3, a cornea 10 having centerline 20 is depicted for treatment with a parabolic contact lens 14 having an inner surface facing epithelium 12. Epithelium 12 includes an outer surface 13 and an inner surface 16. In accordance with the principles of the present invention, in a pre-treatment configuration, outer surface 13 of epithelium 12 does not conform to the contours of the inner surface of contact lens 14 such that there exits a gap 18 or hypertrophy volume 18 between the epithelium 12 and the contact lens 14. The hypertrophy volume 18 is created due to the relative flatness of the contact lens 14 relative to cornea 10. The contact lens 14 helps reshape the cornea 10 when worn by a patient because over time the epithelium 12 conforms the contours of the inner surface of contact lens 14 as outer surface 13 moves outwardly toward contact lens 14. Outward movement in this context refers to movement of the outer surface 13 toward contact lens 14 (e.g., as may be caused by epithelium or stromal tissue growth) and does not refer to migration of epithelium cells such as that caused by conventional orthokeratology treatments. After the contact lens 14 has been worn by the patient for a sufficient amount of time, the hypertrophy volume 18 is filled by the outward movement of epithelium 12, thereby achieving the desired refractive adjustment of the eye.

Figure 5A:
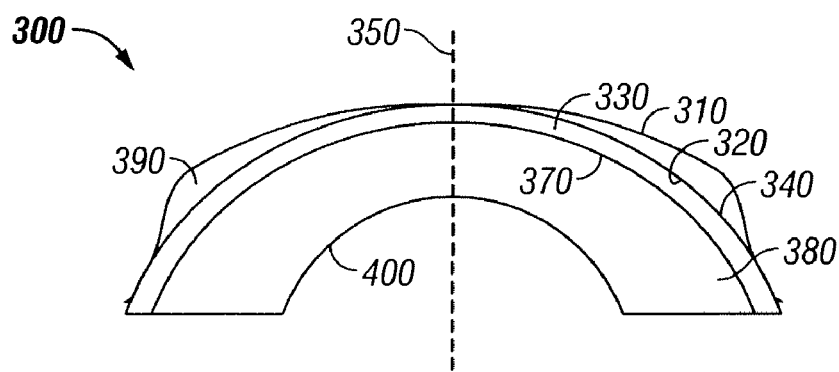
FIGS. 5A and 5B depict a cross section view of an embodiment of an orthokeratological contact lens of the present invention disposed on a corneal surface and illustrate stromal tissue growth and outward movement of the epithelium tissue.
Figure 5B:
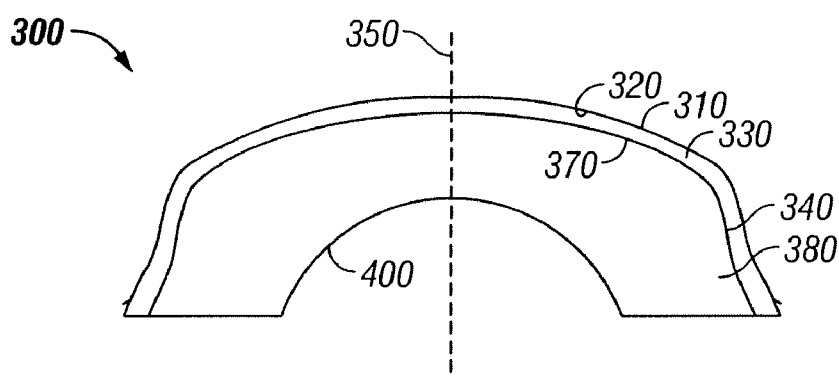

Referring now to FIG. 5A and FIG. 5B, a cornea 300 with centerline 350 is illustrated. These figures also depict contact lens 310, epithelium 330 having outer surface 320 and inner surface 340, stroma 380 having outer surface 370 and inner surface 400, and hypertrophy volume 390. Without being bound by any particular theory of the mechanism of the outward movement of epithelium 330, it is thought that growth of the stroma 380 alone or in combination with growth of epithelium 330 moves outer surface 320 outward toward contact lens 310 such that hypertrophy volume 390 is filled by cornea tissue. FIG. 5B illustrates an increased volume of stroma 380 and illustrates outer surface 320 of epithelium 330 moved outward toward contact lens 310 such that hypertrophy volume 390 has been filled. Although not clearly depicted, epithelium 330 may also increase in volume. Inner surface 340 of epithelium 330 and inner surface 400 of stroma 380 are used to calculate the hypertrophy volume 390 required for the desired refractive adjustment of the eye. After the contact lens 310 has been worn by the patient for a sufficient amount of time, the hypertrophy volume 390 is filled by the outward movement of epithelium 330, thereby achieving the desired refractive adjustment of the eye.

Figure 4:
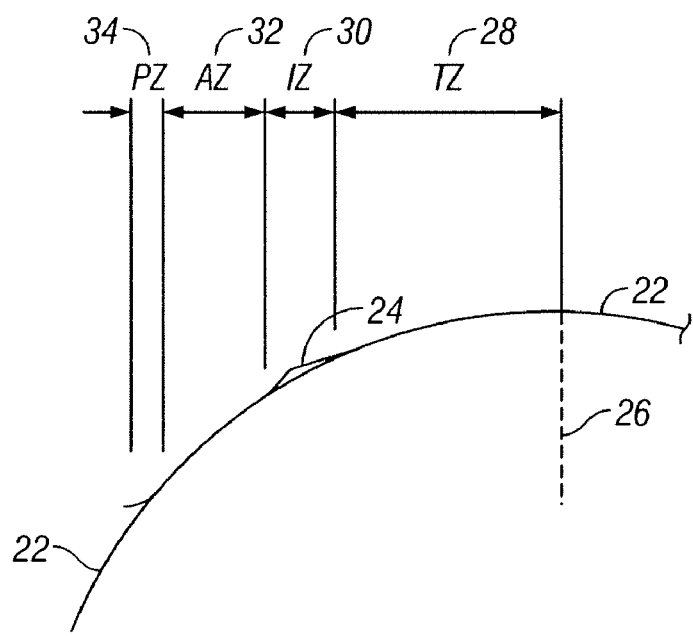
FIG. 4 illustrates a cross sectional view of an embodiment of an orthokeratological contact lens of the present invention disposed on a corneal surface.

Referring to FIG. 4, a cornea 22 is reshaped by the inside surface of contact lens 24, which includes four curved zones comprising treatment zone 28 ("TZ"), inverse zone 30 ("IZ"), alignment zone 32 ("AZ") and peripheral zone 34 ("PZ"), wherein the centerline 26 of the cornea 22 is indicated for orientation. The treatment zone 28, inverse zone 30, alignment zone 32 and peripheral zone 34 preferably each include a predetermined width and curvature. According to the preferred embodiment of the invention, each curved zone is parabolic to maximize the effect on the cornea. In addition, the width of treatment zone 28 is preferably optimized to obtain the desired eye corrective result, and the inverse zone 30 and the alignment zone 32 are preferably designed to meet the particular characteristics of the cornea.

Figure 1:
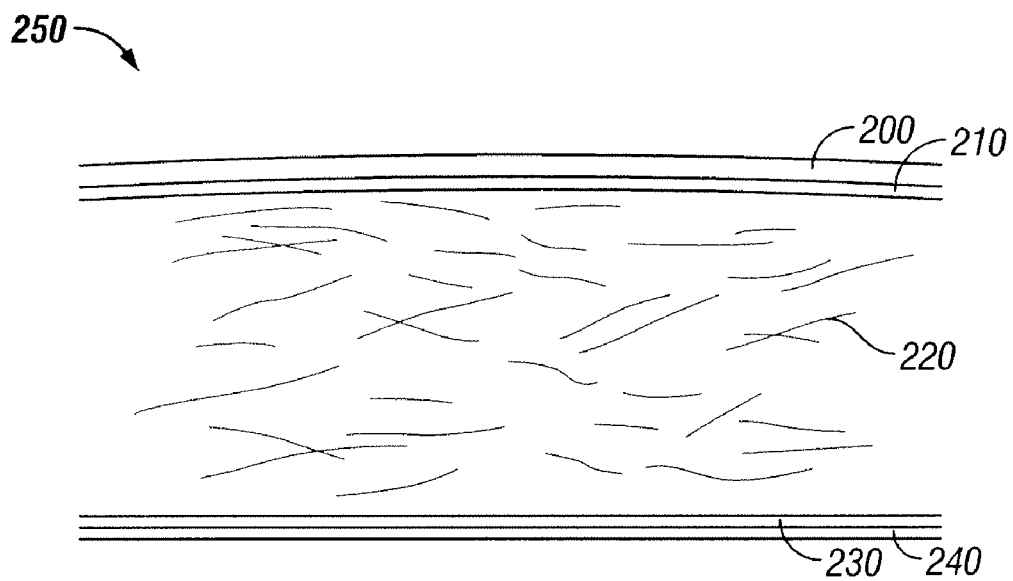
FIG. 1 (prior art) illustrates a cross sectional view of a cornea illustrating the cornea's five layers of tissue.
Figure 2:
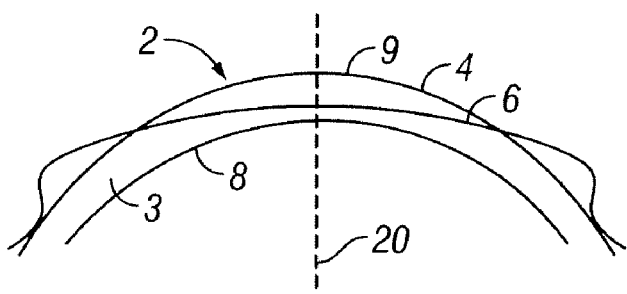
FIG. 2 (prior art) illustrates a cross sectional view of a cornea illustrating a known approach to an orthokeratological reshaping of the cornea by central corneal thinning.

According to an aspect of the invention, the orthokeratology contact lens 24 rests on the cornea 22 of a patient's rather than putting significant pressure on the eye tissue, as is the case with many conventional contact lenses, including the contact lens 6 depicted in FIG. 1. From a physiologically standpoint, there is no compression of the epithelium or migration of cells due to the contact lenses of the present invention. Instead, the contact lenses of the invention are designed to cause epithelial cell and/or stroma cell hypertrophy into the hypertrophy volume 18 (see FIG. 3 and FIGS. 5A and 5B). As epithelial tissue and/or stroma tissue hypertrophies into the hypertrophy volume 18, a new lens shape forms that corrects the myopic condition of the eye.

An orthokeratology contact lens preferably is employed to optimize the diameter of treatment zone 28. Specifically, the contact lens is used to determine the largest wearable overall contact lens diameter that will bring about the greatest refractive change in the patient's eye. Then, the orthokeratology contact lens is used to determine appropriate widths for the inverse zone 30 and the alignment zone 32. The resulting lens design is therefore determined by a patient's individual corneal shape. Advantageously, such a lens design enables a great amount of change in eye shape in a short time and results in a longer maintenance period for the corrected eye.

Testing has shown that using the largest reasonable overall diameter for the contact lens is advantageous to the orthokeratology outcome. The maximum overall diameter is limited by increasing discomfort when it exceeds particular limits. However, a smaller lens will require more time to cause the desired orthokeratological adjustment. In a preferred embodiment, the overall diameter of the contact lens is chosen such that the lens is both comfortable to the patient and results in effective orthokeratological treatment over a reasonable amount of time. According to some embodiments, the maximum overall diameter of a lens may be determined by measuring the minimum diameter of the cornea and subtracting approximately 0.2 mm.

With further reference to FIGS. 5A and 5B, it has been observed that orthokeratological adjustment of the cornea occurs by growth of the epithelium 330 and/or stroma 380 by cellular hypertrophy into the hypertrophy volume 390. By contrast, conventional lenses achieve the desired changes by thinning or compression of the central portion of the cornea. As explained hereinabove, the epithelium hypertrophy volume 390 comprises the gap between inner contact lens surface and the pre-treatment position of the outer surface 320 of epithelium 330. The epithelium 330 and the stroma 380 are the layers largely affected by orthokeratology. The total volume of epithelium 330 and stroma 380 in the patient's cornea 300 determine the maximum orthokeratological adjustment that may be achieved.

With further reference to FIG. 4, the rigid gas permeable orthokeratology contact lens 24 of the present invention has four distinct zones including treatment zone 28, inverse zone 30, alignment zone 32 and peripheral zone 34. Treatment zone 28, which may be referred to herein as the "optic zone", comprises the centermost zone of the lens 24. This zone includes a substantially parabolic shape, which is flatter by a predetermined amount than the flattest meridian of the cornea 22. The amount of flatness of treatment zone 28 is precisely determined since this zone forms the hypertrophy volume 18 (see FIG. 3) into which the corneal tissue hypertrophies, thereby correcting the refractive error of the patient's eye.

Inverse zone 30 preferably comprises a parabolic curve that is steeper than the adjacent treatment zone 28, instead of being flatter than the treatment zone 28, as in conventional orthokeratology contact lenses. The precise curvature and width of inverse zone 30 are determined according to the specific anatomical parameters of the patient's cornea 22, so that the inverse zone 30 returns the lens 24 to the eye precisely without over or under shooting the target cornea 22.

Alignment zone 32 begins at the point where inverse zone 30 returns the lens to the eye. The parabolic curvature of alignment zone 32 preferably matches the parabolic curvature of the cornea as closely as reasonably possible, thus providing a substantially closed cavity and creating the pressure forces that initiate epithelial movement outward into the hypertrophy volume 18. The pressure forces lead to the ultimate reshaping of the cornea 22 necessary to correct the visual problem. The width of alignment zone 32 is determined by calculating the attractive force required to stabilize the lens on the eye, and then adjusting this width by the epithelial and stromal volume factor. Peripheral zone 34 is also parabolic in shape, yet is slightly flatter than the underlying cornea 22 to provide for peripheral tear exchange.

It has been observed that the epithelial and stoma tissue volume within the cornea determines the maximum prescriptive error adjustment that can be achieved for an eye. The epithelial tissue volume is calculated by multiplying the average epithelial thickness for the cornea by the area of the cornea over a chord length that is approximately 6.5 mm in diameter. Similarly, the stromal tissue volume is calculated by multiplying the average stromal thickness for the cornea by the area of the cornea over a chord length that is approximately 6.5 mm in diameter. The average epithelial and stromal thickness is determined through a series of measurements, for example using an ultrasonic pachometer. An eye having a greater epithelial and/or stomal thickness, and therefore a greater epithelial and/or stromal tissue volume, is capable of receiving a greater orthokeratological correction than an eye having a thinner epithelial and/or stromal thickness.

If the epithelial and/or stromal tissue volume is too small to enable full correction of the patient's myopic condition, the treatment zone 28 is reduced in size through a corresponding increase in the width of alignment zone 32. Thus, by measuring the epithelial and/or stromal tissue volume and determining and adjusting the lens parameters to control the ratio of alignment zone width to treatment zone width, a precise prescription change can be rapidly and accurately achieved. The width of alignment zone 32 is determined by applying an epithelial and/or stromal volume factor adjustment.

The parabolic shape of the contact lenses of the present invention comprises a distinct advantage over conventional rigid gas permeable lenses because the cornea is also parabolic in shape, thus enabling rapid and long lasting corneal changes. The methods described herein lead to a one lens per patient eye design that achieves rapid and precisely controlled results, as opposed to the well known practice of using and changing lenses several times to achieve a desired result.

Figure 6:
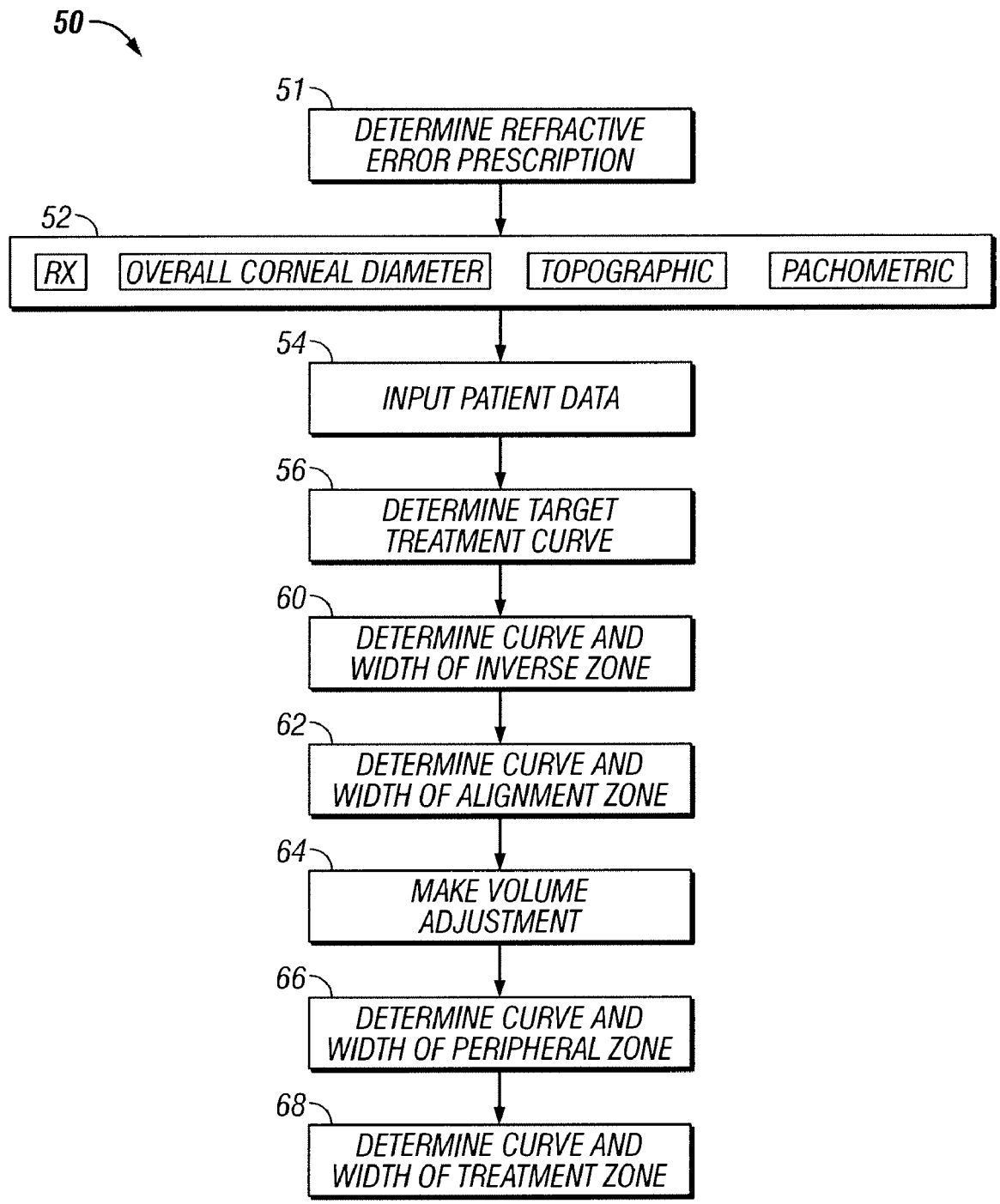
FIG. 6 a block diagram depicting an embodiment of a method of producing an orthokeratological contact lens for reshaping a patient's cornea by epithelium tissue movement, in accordance with the principles of the present invention.

Referring to FIG. 6, a preferred method 50 for determining an appropriate prescription for the contact lenses of the present invention will now be described. In step 51, the refractive error prescription is determined using traditional eye examination and refraction techniques that are per se known in the art. Step 52 involves determining the overall corneal diameter by measuring a shortest visible iris diameter and subtracting 0.2 mm from the measured diameter. Measuring the diameter can be achieved using an ultrasonic pachometer or other suitable device. This step should yield a contact lens that is substantially the largest comfortable lens for the patient's eye. Step 54 involves inputting patient eye data, while step 56 involves determining the topography of the cornea. The step of determining the topography of the cornea involves determining the curvature and elevation at critical points on the cornea.

In step 60, the curvature and width of the inverse zone is determined according to the specific anatomical parameters of the patient's cornea, so that the inverse zone returns the contact lens to the eye precisely without over or under shooting the target cornea. The inverse zone is initially assigned a width of 0.6 mm, and is increased by the distance the parabolic curve has to go. The slope of the parabolic curve is maintained low for wearer comfort, and higher prescriptions require a wider inverse zone to facilitate returning the lens to the cornea. Therefore, the width of inverse zone is increased 0.01 mm for every 0.50 diopter of relative lens flatness. For example, a 2-diopter flat target lens has an inverse zone width of about 0.64 mm, while a 4-diopter flat lens has an inverse zone width of about 0.68 mm. Knowing the width of the inverse zone, the inverse zone parabolic curve is then calculated such that its curve (beginning at the edge of the treatment zone) causes the distal edge of the inverse zone to just reach the corneal surface at which point the alignment zone begins.

Step 62 involves determining the curvature and width of the alignment zone, wherein the width of the alignment zone is determined by calculating the attractive force required to stabilize the lens on the eye, and then adjusting this width by the epithelial and/or stromal volume factor. This width is initially assigned as 1.0 mm, and increases by 0.1 mm per diopter of relative lens. The width is then adjusted by multiplying it by the epithelial and/or stromal tissue volume factor to determine the final width of alignment zone. The curve of alignment zone comprises a parabola based on the topography measurements such that the alignment zone is substantially parallel with the contour of the corneal surface on which it rests.

Step 64 involves determining the epithelial and/or stromal volume factor and making an appropriate volume adjustment. The epithelium volume of the cornea may be determined by conducting pachometry on the cornea using a center point, a point 3 mm below the center point, a point 3 mm above the center point, a point 3 mm lateral to the center point, and a point 3 mm medial to the center point. The average epithelial thickness is then calculated from these five pachometry measurements. The thickness of the epithelia is measured and the total epithelial volume over a 6.5 mm cord is calculated. The epithelial tissue volume factor is defined to be equal to 1.00 if the maximum refractive change potential is greater than or equal to the desired change. This results in no adjustment to the diameter of alignment zone, as none is necessary to achieve the desired result. However, if the maximum refractive change potential is less than the desired change, then the epithelial tissue volume factor is determined from experimentally derived data that compares epithelial tissue volume values to refractive change potential.

Such data may be in the form of a nomogram, which relates epithelial tissue volume factor to the difference between the maximum refractive change potential and the desired change. Similarly, the stromal volume of the cornea may be determined by conducting pachometry on the cornea using a center point, a point 3 mm below the center point, a point 3 mm above the center point, a point 3 mm lateral to the center point, and a point 3 mm medial to the center point. The average stromal thickness is then calculated from these five pachometry measurements. The thickness of the stroma is measured and the total stromal volume over a 6.5 mm cord is calculated. The stromal tissue volume factor is defined to be equal to 1.00 if the maximum refractive change potential is greater than or equal to the desired change. This results in no adjustment to the diameter of alignment zone, as none is necessary to achieve the desired result. However, if the maximum refractive change potential is less than the desired change, then the stromal tissue volume factor is determined from experimentally derived data that compares stromal tissue volume values to refractive change potential. Such data may be in the form of a nomogram, which relates stromal tissue volume factor to the difference between the maximum refractive change potential and the desired change.

With further reference to FIG. 6, step 66 involves determining the width and curvature of the peripheral zone, which comprises the outermost zone of the lens that is approximately 0.4 mm wide with a steep parabolic lift that flattens to an equivalent radius of curvature of about 11.25 mm. In step 68, the width and curvature of treatment zone are determined.

Beginning with the overall corneal diameter as determined in step 52, the inverse zone, alignment zone and peripheral zone widths calculated in steps 60, 62 and 66, the largest allowable treatment zone is determined using the following equation: $TZ=OD-2*PZ-2*AZ-2*IZ$, where TZ is the width of the treatment zone in mm, OD is the overall diameter of the contact lens in mm, PZ is the width of the peripheral zone in mm, AZ is the width of the alignment zone in mm, and IZ is the width of the inverse zone in mm. The diameter of treatment zone is determined by comparing the corneal topography to the target prescription change. Advantageously, a contact lens produced by this method causes epithelial reshaping (through epithelium and/or stromal tissue growth) as required for a particular eye, and also yields an improved maintenance period.

According to some embodiments of the invention, lens thickness is set to approximately 0.23 mm at the center of the lens. This prevents lens flexure and ensures mold rigidity. Edge thickness is calculated and adjusted for patient comfort by trial and error. The contact lenses described herein preferably comprise known high or hyper DK gas permeable materials that are approved by the Federal Drug Administration for use in overnight wear. As would be appreciated by those of ordinary skill in the art, many other types of lenses may be employed without departing from the scope of the present invention.

Thus, it is seen that rigid orthokeratological contact lenses and methods for prescribing the same are provided. While various embodiments of the present invention have been described above, it should be understood that they have been presented by way of example only, and not of limitation. Likewise, the various diagrams may depict example configurations for the invention, which is done to aid in understanding the features and functionality that may be included in the invention. The invention is not restricted to the illustrated example configurations, but the desired features may be implemented using a variety of alternative configurations. Indeed, it will be apparent to one of skill in the art how alternative configurations may be implemented to implement the desired features of the present invention. Additionally, with regard to flow diagrams and method claims, the order in which the steps are presented herein shall not mandate that various embodiments be implemented to perform the recited functionality in the same order unless the context dictates otherwise. It is noted that equivalents for the particular embodiments discussed in this description may practice the invention as well.

In addition, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An orthokeratological contact lens to be worn on a patient's cornea, comprising:
   a parabolic lens having an inner surface configured to face an epithelium of the patient's cornea;
   wherein the parabolic lens is adapted to reshape the cornea by way of epithelium or stromal tissue growth.

2. The contact lens of claim 1, wherein, in a pre-treatment configuration, an outer surface of the epithelium does not conform to the contours of the inner surface of the parabolic lens such that there exits a gap between the epithelium and the parabolic lens.

3. The contact lens of claim 2, wherein the gap comprises a hypertrophy volume.

4. The contact lens of claim 3, wherein after the patient has worn the parabolic lens for a sufficient amount of time, the hypertrophy volume is filled by stroma and epithelium tissue, thereby achieving the desired refractive adjustment of the cornea.

5. The contact lens of claim 3, wherein the parabolic lens is adapted to promote epithelial and stromal cell hypertrophy into the hypertrophy volume, thereby creating a new lens shape forms that corrects a myopic condition.

6. The contact lens of claim 1, wherein the parabolic lens helps reshape the cornea when worn by the patient because the epithelium conforms the contours of the inner surface of the parabolic lens over time.

7. The contact lens of claim 1, wherein the parabolic lens includes a plurality of zones.

8. The contact lens of claim 7, wherein the plurality of zones comprises 4 separate zones.

9. The contact lens of claim 7, wherein the plurality of zones comprises a treatment zone, an inverse zone, an alignment zone and a peripheral zone.

10. The contact lens of claim 7, wherein each zone includes a predetermined width and curvature.

11. The contact lens of claim 1, wherein the parabolic lens is configured to rest on the cornea with an optimum pressure on the eye tissue so as to impart desired change without significant compression of the epithelium or migration of cells.

12. A method of determining a prescription for an orthokeratological contact lens for reshaping a patient's cornea by outward movement of epithelium tissue, comprising the steps of:
    determining the refractive error prescription of the cornea using traditional eye examination and refraction techniques;
    calculating the epithelium and stromal volume of the cornea; and
    making an appropriate volume adjustment based upon the epithelium and stromal volume of the cornea.

13. The method of claim 12, wherein the contact lens comprises a parabolic lens having a plurality of zones including a treatment zone, an inverse zone, an alignment zone and a peripheral zone.

14. The method of claim 13, further comprising the step of determining the curvature and width of the inverse zone, alignment zone and peripheral zone.

15. The method of claim 14, further comprising the step of determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

* * * * *